Sept. 28, 1954     J. E. FINE     2,690,041
BUCK RAKE

Filed Aug. 1, 1952     3 Sheets-Sheet 2

INVENTOR
JACK E. FINE

BY *Ralph D. Bassett*

ATTORNEY

Sept. 28, 1954     J. E. FINE     2,690,041
BUCK RAKE
Filed Aug. 1, 1952     3 Sheets-Sheet 3
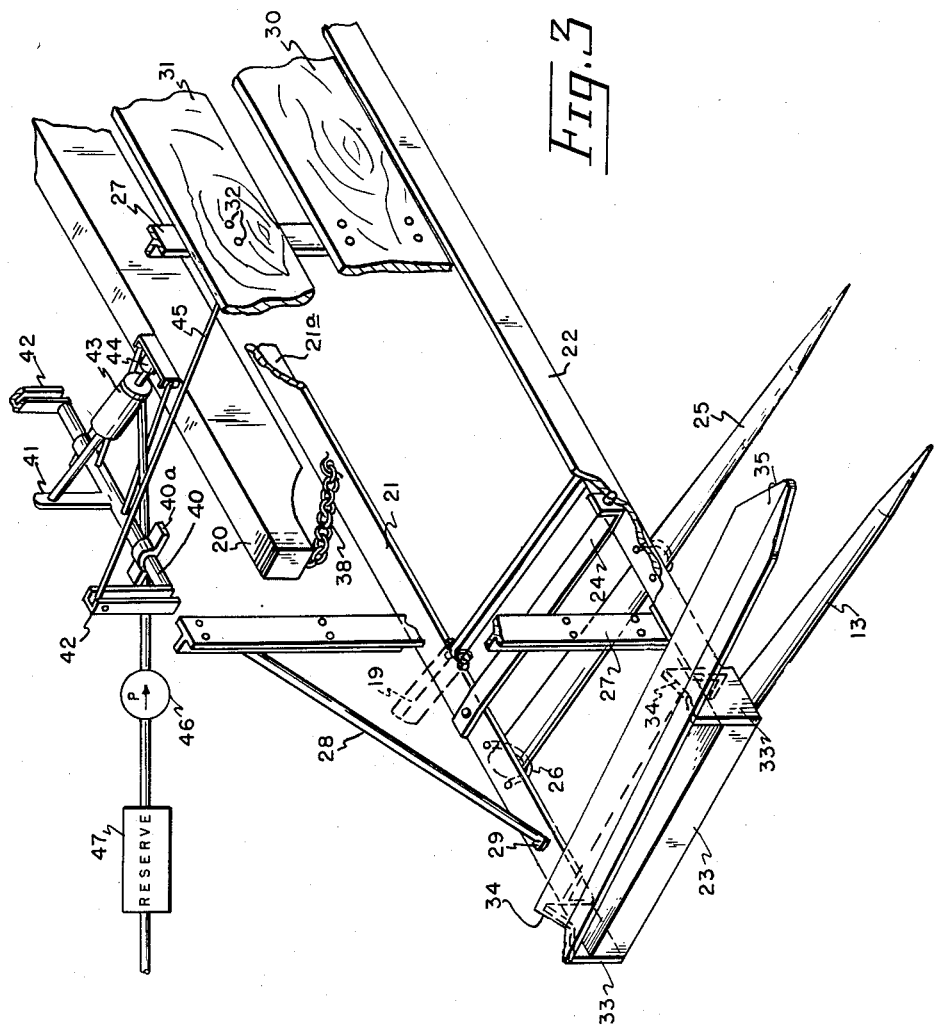
INVENTOR
JACK E. FINE
BY *Ralph L. Bassett*
ATTORNEY Patented Sept. 28, 1954

2,690,041

UNITED STATES PATENT OFFICE 2,690,041

BUCK RAKE

Jack E. Fine, Frenchglen, Oreg.

Application August 1, 1952, Serial No. 302,130

6 Claims. (Cl. 56—27)

This invention relates to improvements in buckrakes and more particularly in the mounting for such rakes on motor vehicles in such a manner that the traction of the vehicle is increased in proportion to the load carried by the rake.

Another object of the invention is the provision of novel supporting means for the buckrake on the frame of the vehicle so as to facilitate the handling of the rake during its use and to further provide for the turning of the rake in a proper arcuate path rather than by the usual methods which require a lateral dragging movement.

A further object of the instant invention is the provision of convenient controls for the vehicle and for the rake and the inclusion of a hydraulic lift for the rake, the latter being longitudinally and medially supported over the vehicle differential housing to properly distribute the load in a manner to provide for suitable manipulation of the associated parts.

Further objects of the invention will more clearly hereinafter appear by reference to the accompanying drawings forming a part of the instant application, wherein like characters of reference designate corresponding parts throughout the several views, in which:

Fig. 3 is a partial isometric view of the buckrake assembly and operating parts with parts broken away.

Figure 1:
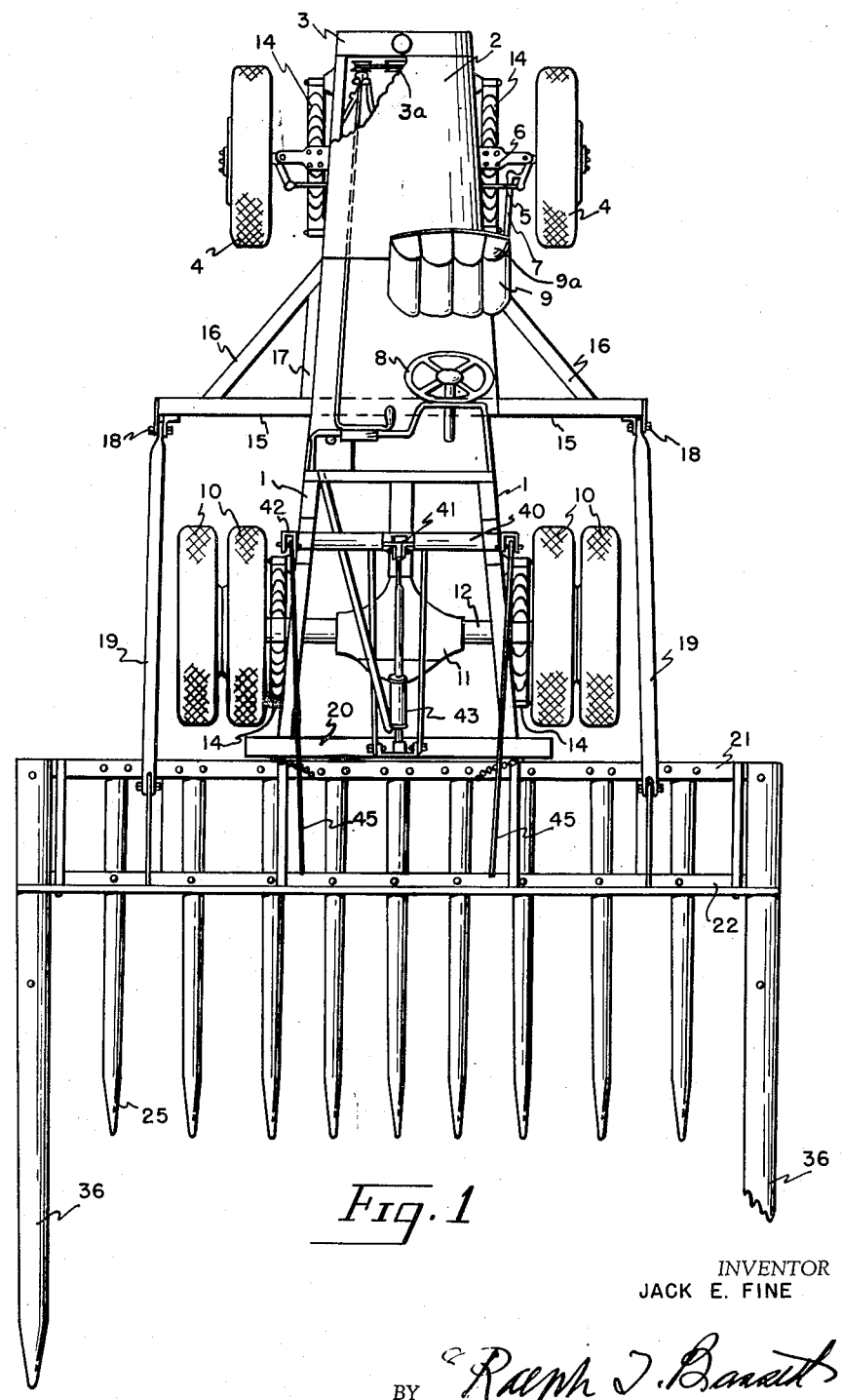
Fig. 1 is a top plan view of the assembly with parts broken away.
Figure 2:
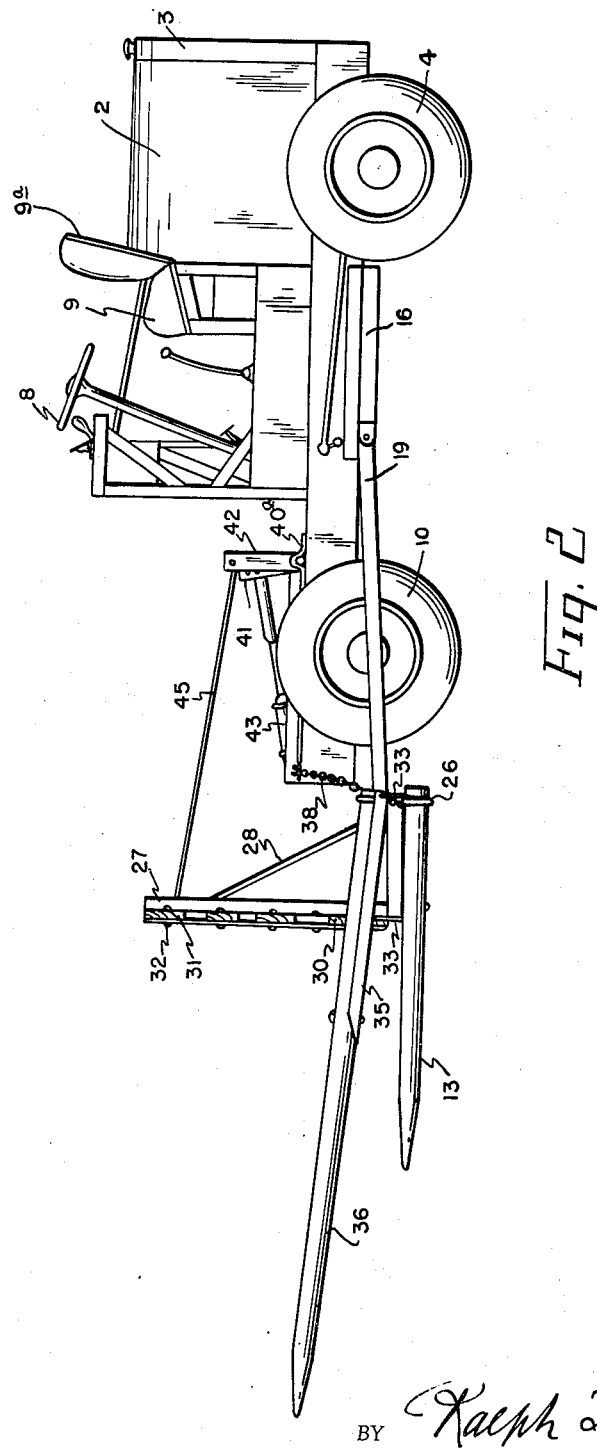
Fig. 2 is a side elevation.

By reference to the drawings it will be seen that the invention is illustrated with a conventional truck embodying a suitable chassis having side frame members 1, cross braced in the usual manner, and supporting at its rear end an engine confined in the housing 2, the engine being provided with the usual cooling system including the radiator 3 and a suitable fan 3ª. Any conventional fan may be provided but preferably a large push-type structure is mounted in a manner to facilitate the use of the present equipment. It will be noted that a standard truck has been utilized with the assembly of the truck reversed so that the steered wheels 4 are at the rear of the vehicle, these wheels being mounted on the usual stub axles as at 5, connected by the main axle section 6, the stub axles 5 being actuated through the usual linkage shown at 7 and under control of the steering wheel 8. A seat for the driver is shown at 9, the seat being positioned with its back 9ª against the engine housing 2 and facing the steering wheel 8 to permit control of the vehicle. By the reversal of the control parts of the vehicle, the traction wheels are positioned forwardly as at 10, the present assembly illustrating a dual traction wheel vehicle driven through the usual differential provided in housing 11 through drive shafts 12. The spring suspension is of leaf form being illustrated generally at 14 over the front and rear axles.

Rearwardly of the front traction wheels 10 is a relatively heavy cross beam 15. This beam 15 is connected to and supported by the framing of the vehicle and extends transversely of the vehicle frame and projects laterally thereof, as best shown in Fig. 1. The laterally extending arms of the beam 15 have secured at their end portions the hinged mountings 18 for hingedly supporting the push arms 19 which operate the bulkhead 27, as will be more fully hereinafter described. Angular braces 16 and connecting brace arms 17 reinforce the laterally projecting arms of the heavy cross beam 15 and generally brace the structure and add the necessary strength for applying the thrust and in handling the load of the buckrake assembly.

The rake assembly and associated parts are best shown in Fig. 3 and comprise a rectangular frame formed by the longitudinal angle iron rails 21 and 22, and connecting end members 23. Suitable cross braces 24 are positioned between the longitudinal frame members 21 and 22 for providing the required rigidity for the structure. The rear longitudinal frame member 21, being formed of angle iron, has its depending flange rearwardly to receive the thrust from the ends of the rake tines 25 which are provided in any suitable number and properly spaced and tapered in the usual manner projecting beneath the front longitudinal frame member 22 and being connected to this frame member and to the rear frame member 21 by U-bolts 26. The front frame member 22 directly supports the bulkhead structure which includes a series of spaced vertical angle irons of T-form as shown at 27, these vertical frame members being suitably braced by angle plates 28 which are connected at their rearward end 29 to the rear frame member 21 and at their front end to the upright frame members 27 by welding, bolts or otherwise. The vertical bulkhead frame members 27 and their angle braces 28 may be suitably spaced to provide necessary supports for the bulkhead paneling 30—31, the panel member 30 being relatively wide in comparison with the balance of the panel structures 31, and all of these panels being bolted at 32 to the uprights 27 through the wings of the T-angles as shown in Fig. 3.

At each end of each of the longitudinal frame members 21 and 22 are supporting plates 33 formed with V-shaped notches 34 for receiving the concave forwardly tapered blind tooth support 35. This concave tooth support 35 is shown as formed of a V-angle but may be otherwise shaped to receive therein the rear end of the blind tooth 36 which is positioned above the rake teeth 13 at each end to hold the hay against lateral discharge and to cooperate with the bulkhead in receiving the load.

Relatively heavy chains 38 are connected to the end frame element 20 of the truck frame and extend in an inwardly and downwardly inclined direction to the bulkhead frame member 21 to suspend the latter in a manner to retain the bulkhead assembly centered with respect to the truck, whereby turning operation of the truck will not be rendered difficult by the lateral swaying of the bulkhead structure mounted thereon.

For operating the buckrake, a hydraulic mechanism is provided including a rock shaft 40 having medial arm 41 and end arms 42, the medial arm 41 connecting with the hydraulic cylinder 43 which is anchored at 44 to the frame member 20. The fluid to the hydraulic cylinder 43 actuates a piston to move arm 41 and rock the shaft 40 in its bearings 40ª to oscillate the end arms 42 which are connected by the braces or cables 45 with the bulkhead to lower the latter and with it the raking teeth to raking position. The hydraulic cylinder 43 is supplied by power from a pump 46 preferably driven by the fan belt of the engine of the truck, the pump supplying liquid in a circuit to the hydraulic cylinder 43 under necessary pressure to actuate the latter. A fluid reservoir 47 is preferably provided in the circuit as well as an actuating valve 48, the latter being connected to suitable means such as a pedal on the floorboard of the truck as shown at 49.

The foregoing structure provides an assembly which is capable of being associated with any suitable light tractor, the association with the tractor being such that the necessary traction power is in part developed by the weight of the load which is immediately adjacent the traction wheels of the truck. The connection with the tractor involves a minimum of parts which are relatively cheap to manufacture and easy to assemble and the operating means for the assembly including the hydraulic lift controlling the teeth and bulkhead provides more than adequate power and eliminates manual labor normally attendant in the operation of such devices.

What I claim is:

1. A buckrake assembly for use with a motor vehicle having a frame including side and end frame members, said buckrake structure including a fabricated transversely extending rectangular frame having front and rear angle bar elements and connecting braces, the rear angle bar having one flange depending downwardly at the rear of the other flange, rake teeth projecting forwardly from the frame with the rear ends of said teeth abutting said depending flange and bolted to the forwardly extending flange, forwardly aligned notched supporting plates carried at each end of the rectangular frame, elongated concave blind tooth supports supported by said supporting plates and extending forwardly of said rectangular frame, a bulkhead for said rake, a rock shaft connected to said bulkhead, and a hydraulic motor for operation of said rock shaft.

2. The structure of claim 1 characterized in that the elongated concave blind tooth support is mounted upon the rear angle bar of the frame and is supported forwardly upon upwardly projecting brackets connected with the front angle bar element.

3. The structure of claim 1 characterized in that the bulkhead includes upright frame members supported by the front angle bar of the rectangular frame and includes transversely extending panels, the lower panel being of greater width than the upper panels.

4. The structure of claim 1 characterized in that the end frame member of the truck frame has its bottom end portions cut away to provide freedom of movement of the inwardly extending flexible supports connecting the end portions of said end frame member and said rectangular frame.

5. A buckrake attachment for use with a motor vehicle having side and end frame members, a buckrake structure extending ahead of the truck and flexibly suspended thereby for limited lateral movement, said structure including a fabricated transversely extending rectangular frame having front and rear angle bar elements and end connecting braces, the rear angle bar having one flange depending downwardly at the rear of the other flange, rake teeth projecting forwardly from said rectangular frame, said rake teeth having their rear ends abutting said depending flange, elongated forwardly extending concave blind tooth supports mounted at the ends of said rectangular frame and above the horizontal plane of said teeth, said blind tooth support being inclined upwardly, a bulkhead supported by the forward angle bar element of the rectangular frame, a transverse supporting structure for the rectangular frame projecting laterally from each side of the motor truck frame medially of its length, elongated links connecting said support with said bulkhead, a control mechanism for said bulkhead including a hydraulic motor carried by said truck frame, said motor being adapted for connection at one end to an end frame member of the truck frame, a rock shaft operated by said hydraulic motor, links connecting the end portions of the rock shaft with said bulkhead, and means for controlling said hydraulic motor to shift said rock shaft upon its supporting frame.

6. The structure of claim 5 characterized in that converging flexible means project inwardly from the end frame member of the truck frame and connect with said rectangular frame for limiting the lateral movement of said bulkhead assembly.

References Cited in the file of this patent
UNITED STATES PATENTS

| Number | Name | Date |
|---|---|---|
| 2,147,884 | Cope | Feb. 21, 1939 |
| 2,271,591 | Hickman | Feb. 3, 1942 |
| 2,388,411 | Hicks | Nov. 6, 1945 |
| 2,592,824 | Richey | Apr. 15, 1952 |